United States Patent [19]

Mitch

[11] Patent Number: 4,740,411
[45] Date of Patent: Apr. 26, 1988

[54] AN ARTICLE FOR PLACING AN ELONGATE MEMBER OF GENERALLY CYLINDRICAL FORM IN A PREDETERMINED POSITION

[75] Inventor: John H. Mitch, Troutdale, Oreg.

[73] Assignee: Tektronix, Inc., Beaverton, Oreg.

[21] Appl. No.: 854,628

[22] Filed: Apr. 22, 1986

Related U.S. Application Data

[62] Division of Ser. No. 709,478, Mar. 7, 1985.

[51] Int. Cl.[4] .......................... B32B 1/00; G02B 6/38; G02B 6/40
[52] U.S. Cl. .................................... 428/178; 428/174; 428/186; 428/188; 428/198; 428/201; 428/209; 350/96.21; 350/96.22
[58] Field of Search ............... 428/174, 178, 186, 188, 428/198, 201, 209; 156/158, 305, 313; 350/96.21, 96.22

[56] References Cited

U.S. PATENT DOCUMENTS

| | | | |
|---|---|---|---|
| 3,860,405 | 1/1975 | Concoulas et al. | 65/59.3 |
| 3,912,574 | 10/1975 | Cherin et al. | 350/96.21 |
| 3,984,172 | 10/1975 | Miller | 350/96.21 |
| 4,028,162 | 6/1977 | Cherin et al. | 156/158 |
| 4,109,369 | 8/1978 | Taylor | 350/96.21 |
| 4,186,998 | 2/1980 | Holzman | 350/96.21 |
| 4,475,790 | 10/1984 | Little | 350/96.21 |
| 4,594,121 | 6/1986 | Mitch | 156/158 |
| 4,634,216 | 1/1987 | Calero et al. | 350/96.21 |
| 4,636,033 | 1/1987 | Gagen | 350/96.21 |

*Primary Examiner*—John E. Kittle
*Assistant Examiner*—Patrick J. Ryan
*Attorney, Agent, or Firm*—John Smith-Hill; Robert S. Hulse

[57] ABSTRACT

An end portion of an elongate member of generally cylindrical form, such as an optical fiber, is placed in a predetermined position utilizing a substrate having a surface that is defined by a generatrix that is a straight line, e.g. a flat surface. A foil of flexible material is secured to the surface of the substrate and defines with the substrate a generally straight, elongate passageway that is parallel to the generatrix of the surface and has a first portion of substantially uniform cross-section adapted to receive an end of the elongate member in closely fitting relationship and also has a second portion that tapers towards the first portion. The end portion of the elongate member is inserted into the first portion of the passageway by way of the second portion thereof.

12 Claims, 1 Drawing Sheet

AN ARTICLE FOR PLACING AN ELONGATE MEMBER OF GENERALLY CYLINDRICAL FORM IN A PREDETERMINED POSITION

This application is a division of application Ser. No. 709,478 filed Mar. 7, 1985.

This invention relates to an article for placing an elongate member of generally cylindrical form, particularly an end portion of an optical fiber, in a predetermined position.

BACKGROUND OF THE INVENTION

An optical fiber comprises a core of high index material surrounded by a cladding of low index material. The diameter of the core ranges from about 9 $\mu$m for single mode transmission to about 62 $\mu$m for multimode transmission. The external diameter of the cladding is generally about 125 $\mu$m or 140 $\mu$m, regardless of the diameter of the core. The fiber is provided with a plastic buffer coating to protect it from damage.

Although optical fibers can, using known technology, be manufactured so as to have essentially uniform properties over essentially indefinite lengths, it is conventional for such fibers to be sold in lengths of, e.g., one km, and for two or more lengths of fiber to be spliced together, i.e. joined together end-to-end, in order to produce a fiber longer than one km. Moreover, even though a fiber of one km or more can readily be manufactured so that it is without significant defects, handling of the fiber during installation as part of a fiber optic link may result in damage to the fiber, rendering it necessary to remove the damaged portion of the fiber and splice the undamaged portions together. Accordingly, techniques for splicing optical fibers have been developed. Several techniques that are currently in use in installation of fiber optic links involve use of special splice units for receiving the ends of the fibers to be spliced and holding those ends in accurately-determined alignment. It will be understood that any error in alignment of the ends of the fibers results in potential loss in transmission of optical energy through the splice. The splice units are, therefore, manufactured to high accuracy and they typically include several components. Consequently, such units are expensive. The splice units themselves remain permanently installed on the spliced fiber, and therefore cannot be used in making multiple splices.

SUMMARY OF THE INVENTION

According to the present invention there is provided an article of manufacture comprising a substrate having a surface that is defined by a generatrix that is a straight line, and a foil of flexible material that defines with the substrate a generally straight, elongate passageway that is parallel to the generatrix of said surface and has a first portion of substantially uniform cross-section adapted to receive an end of an elongate member of generally cylindrical form in closely fitting relationship and also has a second portion that tapers towards said first portion.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
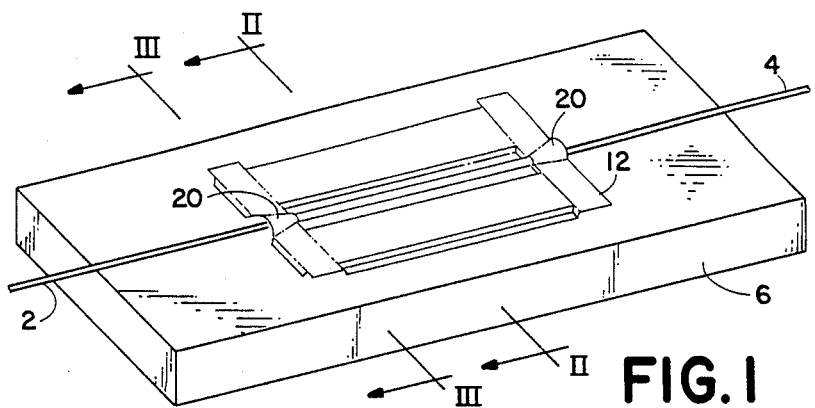
FIG. 1 is a perspective view of a splice unit whereby two optical fibers are joined together.
Figure 2A:
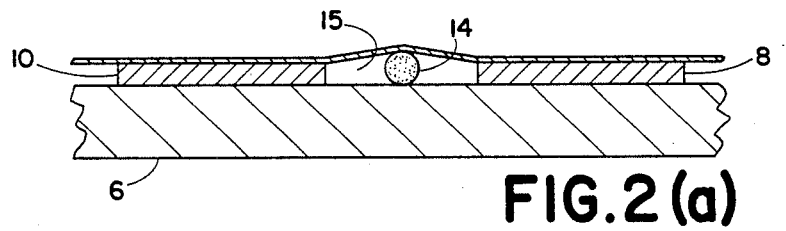
FIG. 2 (a) is a sectional view of the splice unit shown in FIG. 1, taken on the line II—II, at a preliminary stage of formation of the splice unit.
FIG. 2(b) is a sectional view taken on the line II—II at a time subsequent to the time involved in FIG. 2(a) but before completion of the splice unit.
Figure 2B:
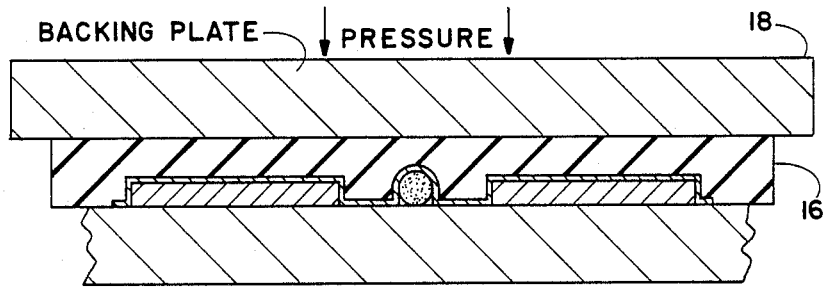
Figure 3:
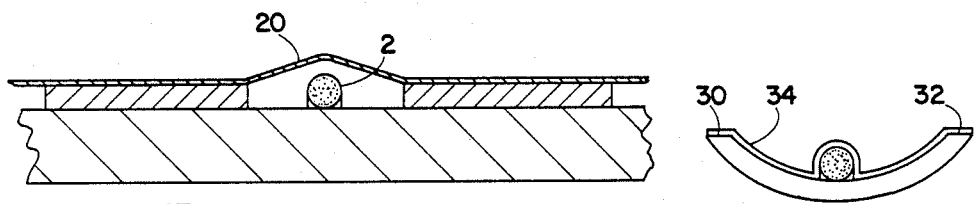
FIG. 3 is a sectional view taken on the line III—III of FIG. 1 after completion of the splice unit.

The splice unit illustrated in FIG. 1 is used to connect together two sections 2 and 4 of optical fiber. The splice unit might be used to connect together sections of an optical fiber that have been separated in order to remove a defective portion, in which case the outside diameters of the two sections will be essentially equal, or alternatively the splice unit might be used to join together two lengths of optical fiber of equal nominal outside diameter, in which event there might be slight differences between the actual external diameters of the two fibers. In either case, differences in external diameter are minimal.

The splice unit comprises a substrate 6, which may be of glass or quartz, and two strips of double-sided adhesive tape, such as the tape sold by 3-M Corporation under the designation Scotch 3M No. 666. The two portions of tape 8 and 10 are in spaced, substantially parallel relationship. The splice unit also comprises an aluminum foil 12 that is adhered to the two portions 8 and 10 of tape and is substantially coextensive with the portions 8 and 10 in the longitudinal direction thereof.

The splice unit is formed by placing the portions 8 and 10 of double adhesive tape on the top surface of the substrate 6 and positioning a section 14 of optical fiber, with its plastic buffer coating removed, in the channel 15 defined between the portions 8 and 10. Preferably, the section 14 of fiber is taken from whichever of the fibers that are to be spliced has the larger external diameter. The foil 8 is then placed in position and is adhered to the portions 8 and 10 of tape, bridging the channel 15 and extending over the section 14 of fiber. Care is taken to insure that the foil is quite tightly stretched between the portions 8 and 10 of tape. Subsequently, the foil is acted upon using a deformable tool 16 having a face that has a width greater than the distance between the two portions 8 and 10 and a length shorter than each of the portions 8 and 10. The tool 16 is placed on top of the foil 12 so that it extends across the space between the portions 8 and 10 while leaving the foil exposed at the two ends of the channel 15. Pressure is then applied to the tool 16 using a backing plate 18, and the deformable tool, by virtue of its deformability, presses the foil down into contact with the substrate along the two sides of the channel without crushing the fiber. This causes the foil to stretch, and this in turn establishes stress in the parts of the foil lying over the channel but beyond the ends of the tool 16. This stress is spontaneously released by upward buckling of the tape at the ends of the channel so as to produce a funnel-like formation 20 at each end of the channel. The tool 16 is removed, and the fiber section 14 is then removed longitudinally from the channel, leaving a passageway of inverted U-shape defined between the substrate 6 and the foil 12. The splice unit is then complete and is ready for use.

In order to splice the two sections 2 and 4 of fiber together, the fibers are first cleaved and the plastic buffer coating is removed from the end of each section. A small quantity of an adhesive that is curable by irradiation with ultraviolet light is introduced into the splice unit by way of one of the funnel formations. The adhesive is permitted to wick to the other end of the passageway, and the fiber ends are inserted into the passageway by way of the two funnel formations respectively. The quality of the optical coupling between the fibers is observed by introducing light into one of the fibers by way of its end remote from the splice unit and observing the light emitted from that end of the other fiber which is remote from the splice unit, and when the desired degree of coupling is achieved the adhesive is cured by irradiation through the substrate 6 with ultraviolet light.

In the completed assembly of the splice unit and the optical fiber sections, the adhesive serves not only to secure the fiber sections to the substrate but also to displace air from between the confronting end faces of the fiber sections and thereby reduce discontinuities in refractive index.

In fabrication of the splice unit, the length section 14 of fiber is used as a form to insure that the size of the passageway that is formed between the top surface of the substrate 6 and the aluminum foil will conform closely to the size required for accommodating the ends of the sections 2 and 4. This serves to minimize need for clearance to accommodate variations in the size of the fiber and therefore insures that the fibers 2 and 4 can be accurately aligned.

The tool 16 is preferably formed from multiple layers (e.g. 10 layers) of adhesive tape that are stuck to one another. One suitable tape is a polyimide tape No. 5413 sold by DuPont and Company under the trademark Kapton. It would, however, be possible to use as the tool 16 a block of hard rubbery material. Of course, a balance must be struck between employing a material that is hard enough to deform the aluminum foil yet soft enough to be able to conform to the contours of the fiber section 14 and the edges of the tape portions 8 and 10 and to avoid crushing the fiber section 14.

The foil 12 is sold by Reynolds Aluminum Company as 1 mil (0.001 inch, or approximately 0.025 mm) thick foil. However, other materials may be used so long as they are sufficiently ductile and inelastic.

The UV curable adhesive is sold by Norland Products, Inc. under the designation Norland Optical Adhesive type 61.

It is, of course, desirable that the splice unit, when assembled with the fiber sections 2 and 4, should be protected from environmental influences. This can be achieved by fitting a heat shrinkable tube over one of the fiber sections prior to formation of the splice. After the splice has been completed, the heat shrinkable tube is then moved so that it covers the splice unit and is exposed to heat so that it shrinks into close contact with the splice unit and the fibers.

Figure 4:
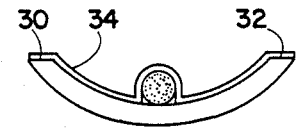
FIG. 4 is a cross-sectional view of a second splice unit.

An alternative construction for the splice unit is shown in FIG. 4. In the case of FIG. 4, the substrate is formed by a sector of a glass tube. Typically, for a fiber that is 125 $\mu$m in external diameter, the internal diameter and the wall thickness of the tube are selected so that the depth of the arcuate channel defined by the tube sector is about 10 mils. Adhesive is applied to the surfaces 30 and 32 of the tube sector, and aluminum foil 34 is applied to the adhesive so that it stretches across the channel defined between surfaces 30 and 32. A tool (not shown) is then brought down into the channel, stretching the foil 34 and forcing it into contact with the interior surface of the tube. As in the case of FIG. 1, the tool is shorter in the longitudinal dimension of the tube sector than is the foil 34, and the portions of the foil that are not pressed into contact with the tube by the tool buckle away from the tube and define respective funnel formations.

Numerous other methods of applying localized pressure to the aluminum foil will occur to persons skilled in the art. For example, instead of using a tool that enters into direct physical contact with the foil, pressure may be generated at a remote location and transmitted to the foil by hydraulic fluid.

It will be appreciated by those skilled in the art that the invention is not restricted to the use of a foil that is formed in situ. A foil could be pre-embossed to the desired shape and then secured directly to the substrate without use of double-sided adhesive tape. Of course, in the event that a pre-embossed foil is used, the advantage of close fitting of the passageway about the fiber sections 2 and 4 owing to use of the section 14 to form the passageway is lost, but this might be tolerable, particularly in the case of multi-mode fibers.

It will be appreciated by those skilled in the art that the invention is not restricted to the particular devices that have been described with reference to the drawings, since variations may be made therein without departing from the scope of the invention as defined in the appended claims, and equivalents thereof. For example, instead of using an adhesive that is curable by ultraviolet light in order to provide index matching between the fibers and to secure the fibers to the substrate, glycerin could be used as the index matching fluid and clamps used to secure the fibers to the substrate. Even in the case that an adhesive is used for index matching and for securing the fibers to the substrate, it is not necessary that the adhesive be curable by exposure to ultraviolet light. For example, a two-component adhesive, which is cured by reaction between the components, could be used and so could an adhesive that is cured by heat.

I claim:

1. An article of manufacture comprising a substrate having a surface that is defined by a generatrix that is a straight line, and a foil of flexible material that defines with the substrate a generally straight, elongate passageway that is parallel to the generatrix of said surface and has a first portion of substantially uniform cross-section adapted to receive an end of an elongate member of generally cylindrical form in closely fitting relationship and also has a second portion that tapers towards said first portion.

2. An article according to claim 1, wherein the passageway is bounded by a strip-form portion of said surface, and the foil has marginal regions extending along opposite edges thereof and said marginal regions are secured to the substrate in a manner such that the marginal regions lie in a plane that is spaced from said strip-form portion of said surface.

3. An article according to claim 2, wherein said surface is flat and wherein said article comprises first and second spacers secured to said surface at opposite sides thereof respectively, and the marginal regions of the foil are secured to said spacers respectively.

4. An article according to claim 2, wherein said surface is concavely curved and the margins of the foil are secured directly to the substrate.

5. In combination, an article of manufacture comprising a substrate having a surface that is defined by a generatrix that is a straight line, a foil of flexible material that defines with the substrate a generally straight, elongate passageway that is parallel to the generatrix of said surface and has a first portion of substantially uniform cross-section and also has a second portion that tapers towards the first portion, and an elongate member of generally cylindrical form having an end portion that extends within said first and second portions of the elongate passageway.

6. A combination according to claim 5, wherein said passageway has a third portion at the opposite end of the first portion from said second portion, said third portion tapering towards said first portion, and further comprising a second elongate member of generally cylindrical form and of diameter substantially equal to that of the first-mentioned member having an end portion that extends within the first and third portions of the passageway and is in end-to-end alignment with the end portion of the first-mentioned member.

7. A combination according to claim 6, wherein said first-mentioned member and said second member comprise first and second sections respectively of optical fiber and the combination also comprises index-matching material in said first portion of the passageway between the confronting end surfaces of the first and second sections of optical fiber.

8. A combination according to claim 7, wherein said index-matching material is a cured adhesive material.

9. An article of manufacture fabricated by providing a substrate having a surface that is defined by a generatrix that is a straight line, securing to said surface a foil of flexible material that defines with the substrate a generally straight, elongate passageway that is parallel to the generatrix of said surface and has a first portion of substantially uniform cross-section adapted to receive an end portion of an elongate member of generally cylindrical form in closely fitting relationship and also has a second portion that tapers towards said first portion, and inserting said end portion of the elongate member into the first portion of the passageway by way of said second portion thereof.

10. An article according to claim 9, wherein said passageway has a third portion at the opposite end of the first portion from said second portion, said third portion tapering towards said first portion, and wherein the article is manufactured by a method that further comprises inserting an end portion of a second elongate member of generally cylindrical form and of diameter substantially equal to that of the first-mentioned member into the first portion of the passageway by way of said third portion thereof so as to place the end portion of the second member in end-to-end alignment with the end portion of the first-mentioned member.

11. An article according to claim 10, wherein said first-mentioned member and said second member comrpise first and second sections respectively of optical fiber and the article also comprises index-matching material in said first portion of the passageway between the confronting end surfaces of the first and second sections of optical fiber.

12. An article according to claim 11, wherein said index-matching material is a cured adhesive material.

* * * * *